April 28, 1964 F. L. DI NARDO 3,131,255
TELEVISION CONTROL SYSTEM
Filed Jan. 2, 1962
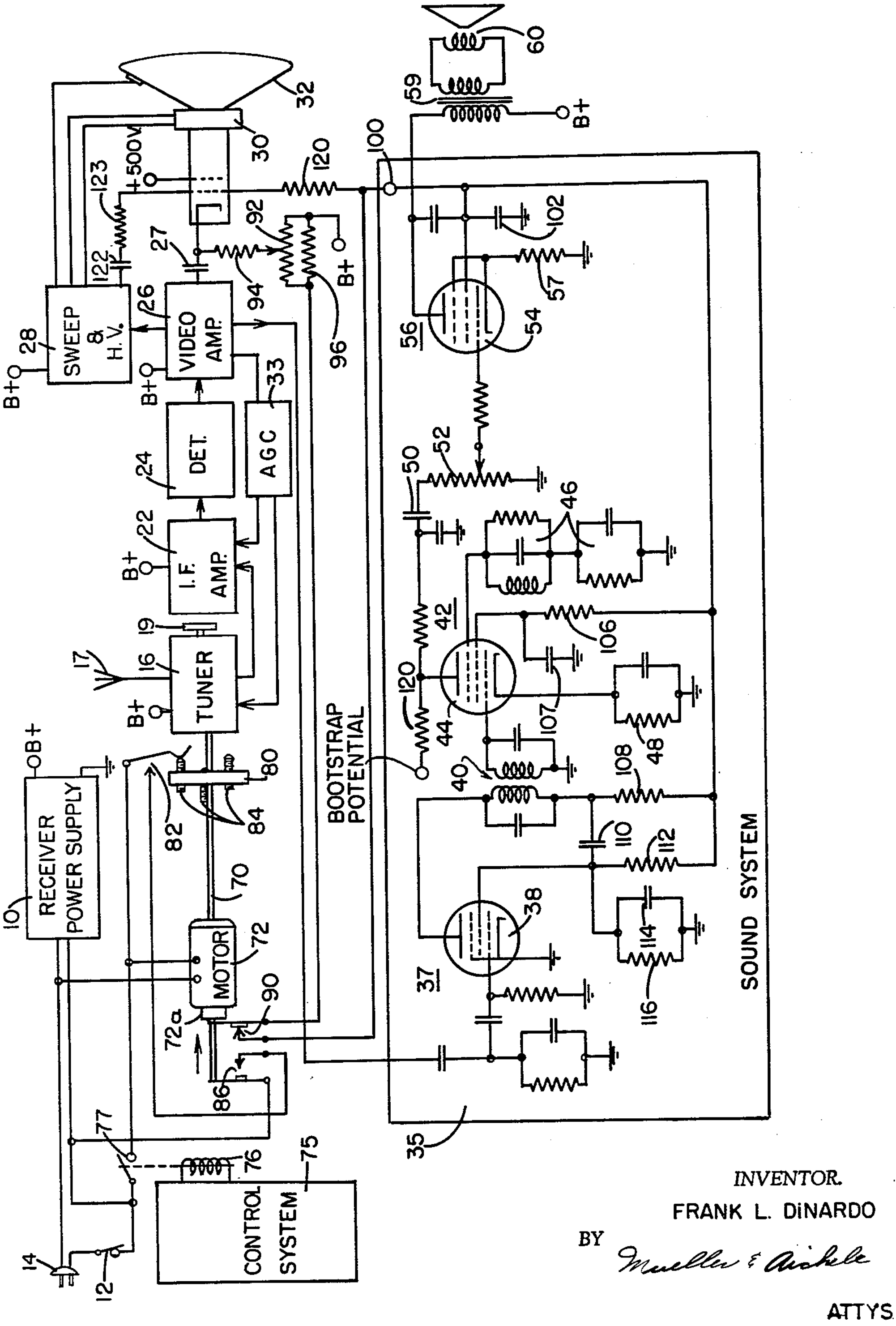
INVENTOR.
FRANK L. DiNARDO
BY Mueller & Aichele
ATTYS.

United States Patent Office 3,131,255
Patented Apr. 28, 1964

3,131,255
TELEVISION CONTROL SYSTEM

Frank L. Di Nardo, Chicago, Ill., assignor to Motorola, Inc., Chicago, Ill., a corporation of Illinois Filed Jan. 2, 1962, Ser. No. 163,754
3 Claims. (Cl. 178—5.8)

This invention relates generally to television receivers and more particularly to a system for muting the sound and blanking the picture during the tuning of such receivers.

When a television receiver is retuned from one channel to another, the receiver may be adjusted momentarily to one or more channels on which no signals are received. A television receiver which is tuned through locally unused channels would produce an unpleasant rush of noise from the speaker because the automatic gain control system in the receiver will maximize the receiver gain to produce background interference and tube noise when a signal of substantial strength is not being received. Furthermore, the image produced by the cathode ray picture tube will comprise a pattern of snow (noise) and the raster may flicker as synchronization is lost and regained in tuning from one desired signal to another. These sound and picture image conditions can be particularly undesirable for a remotely tunable television receiver in which case one or more viewers usually are giving their full attention to the receiver to observe whether a desired program or channel is being selected by the control apparatus.

An object of this invention is to provide a simple and low cost system for automatically muting the sound and blanking the picture in a television receiver during tuning thereof.

A feature is the provision of a cathode ray tube bias network connected in a circuit with the energizing potential for the receiver sound system through a switch which is operated during tuning between channels to cut off the cathode ray tube and to de-energize one or more amplifiers of the sound system.

Another feature is the provision of a normally closed switch operated by a declutching rotor of an automatic tuning motor and connected in a voltage divider network so that opening of the switch permits the cathode of the picture tube to rise to a cutoff potential and permits one or more current drawing electrodes of the sound system amplifier devices to be lowered to an ineffective energizing potential.

In the drawing the figure illustrates in a block and schematic diagram a television receiver incorporating the invention.

In a specific form the invention includes a single switch which is operable to both mute the sound and blank the picture upon tuning of a television receiver. The normally closed switch may be operable by the declutching rotor of an automatic tuning drive motor used, for example, for remote control of the television tuner. A resistor network including a brightness control is connected between the switch in a B+ source of energizing potential. A variable tap of the brightness control is connected to the cathode of the cathode ray picture tube. The sound system of the receiver incorporates an energizing circuit which may include the plate and screen grid of the limiter or driver amplifier tube, the screen grid of a quadrature grid sound detector, the screen grid of an audio frequency power amplifier tube and the bias return for the control grid of the picture tube. This energizing circuit is connected through the normally closed switch to the aforementioned resistor network. Thus, opening of the switch when the tuner motor is operated and the receiver is being tuned through other than desired channels, will interrupt the connection between the resistor network and the sound system energizing circuit to permit the cathode of the cathode ray tube to rise to a cutoff potential thus blanking the image of the picture tube. With the B+ energizing potential open circuited in the sound system, this system will become de-energized to mute the sound from the receiver. The time for sound muting may depend on the time for at least partial discharge of any filter capacitors connected to the screen grids of the aforementioned sound system tubes. This time can be reduced by means of suitable shunt resistances connected in circuit with these filter capacitors.

The television receiver of the figure includes a receiver power supply 10 which is connected through an on-off switch 12 to a power line plug 14 to be energized from the alternating current power line. A source of B+ potential is available from the power supply 10 for the various stages of the receiver.

A tuner 16, including a suitable RF amplifier and mixer-oscillator circuitry is connected to an antenna 17. The tuner 16 is adjustable by means of a manual knob 19 in order to permit selection of a desired channel. Signals at intermediate frequency are derived from the tuner 16 and applied to the intermediate frequency amplifier 22. The amplified signals from amplifier 22 are coupled to the detector 24 which provides a composite video signal including horizontal and vertical synchronizing pulses, as well as a modulated sound subcarrier, all of which are supplied to the video amplifier 26.

The synchronizing components of the composite video signal are coupled to the sweep system 28 which will generate properly synchronized horizontal and vertical deflection signals for application to the deflection yoke 30 on picture tube 32. High voltage for energization of the screen of picture tube 32 is also available from the sweep system 28.

The video portion of the composite video signal is coupled through a capacitor 27 to the cathode of the cathode ray picture tube 32. An automatic gain control circuit 33 is connected to amplifier 26 and to tuner 16 and amplifier 22 to regulate the gain of these latter stages inversely in accordance with the strength of a received signal.

The sound subcarrier derived in detector 24 is translated through the amplifier 26 and to the sound system 35. This sound system includes a limiter-driver stage 37 with a pentode vacuum tube 38 having a control grid to which the sound subcarrier is coupled. The cathode of tube 38 is grounded and the anode is connected to the primary winding of coupling transformer 40. Accordingly, the sound signal which has been amplified and limited is coupled through the transformer 40 to the quadrature grid detector stage 42. Stage 42 includes a pentode tube 44 having a third grid to which the network 46 is connected. The network 46 causes the development of a signal in quadrature with the input signal applied to the control grid of tube 44 so that demodulation of the frequency varied sound subcarrier occurs in the tube 44. Cathode of tube 44 is returned to ground through a bias resistor 48. Audio frequency signals are derived from the anode of tube 44 and applied through the coupling capacitor 50 to the volume control potentiometer 52. A variable arm of potentiometer is connected to the control grid of the pentode and amplifier tube 54 in the power output or audio amplifier stage 56. A cathode of tube 54 is returned to ground through a bias resistor 57. The anode of tube 54 is connected to the primary winding of the audio output transformer 59 which transformer is connected to the loudspeaker 60.

For automatic or motor operation of the tuner 16, the control shaft 70 of the tuner is mechanically joined to the electric motor 72. Motor 72 is intended to include suitable gear reduction means for driving the tuner shaft 70 at a proper speed for performing a channel selection function. The motor 72 is started by the control system 75 which energizes the winding of relay 76 to close contacts 77. This will complete a motor energization circuit to the plug 14 assuming that the on-off switch is closed. The control system 75 may take various forms, the function of any of which is to close the contacts 77. System 75, for example, may be a suitable voltage source, cable and switch which can be remotely operated by a user of the television receiver. On the other hand, it may also comprise a wireless transmitter and receiver which may be operated by a television viewer to energize the relay 76. Several different versions of such control systems are known and further elaboration is not required here.

It is contemplated that the contacts 77 will be momentarily closed when it is desired to automatically adjust the tuner 16. Once shaft 70 has started to rotate, the indexing wheel 80 which is secured to the shaft will turn sufficiently to permit the contacts 82 to close. Contacts 82 are held open by an indexing cam 84 when one of these cams is properly adjusted. Cams 84 are individually associated with the channels to which the tuner 16 may be adjusted and the setting of one or more of the threaded cams to project outwardly to right of indexing wheel 80 will cause switch 82 to open for channel selection. On the other hand, the positioning of any of the cams outwardly of the indexing wheel to the left will cause that cam to pass by the switch 82 without opening its contacts. In this way, the channels to which the tuners 16 are to be automatically tuned by the motor 72 are "programmed" by positioning the appropriate cam 84, and the ones which it is desired to bypass during automatic tuning are merely left in a position to pass the switch 82.

Switch 82 is connected in series with switch contacts 86 and the combination is connected across the relay contacts 77. Contacts 86 are operated by a declutching rotor 72*a* of the motor 72 which moves to the right when the motor 72 is energized. Therefore, once the motor has been energized by the momentary contacts 77, the contacts 86 will be closed, and when the motor has started to turn the index wheel 80 the switch contacts 82 will be closed. Accordingly, the motor energizing circuit is completed through the contacts 82 and 86 even though the contacts 77 will open. Once the desired channel has been reached, a cam 84 will open contacts 82 to break the motor energizing circuit. Contacts 86 will again open when the declutching rotor 72 is released by de-energization of the motor. The reason for contacts 86 is to prevent energization of the motor when the manual tuner adjusting knob 19 is turned and the contacts 82 become closed as the tuner is adjusted to positions where the contacts 82 may be closed.

As previously stated, during the tuning operation it is desirable to avoid the production of sound from the loudspeaker 60 and the appearance of noise signals or a flashing raster on the screen of the picture tube 32. The muting of sound and the blanking of the picture are automatically accomplished in this system by the opening of the contacts 90 which are normally closed but which are opened by the action of the declutching rotor 72*a* moving to the right upon the energization of the motor 72.

A direct current bias is provided for the cathode of the cathode ray picture tube 33 by means of a brightness control resistor 92. The brightness control 92 forms a voltage divider with a fixed portion connected between switch 90 and B+. A variable tap of control 92 is connected through the resistor 94 to the cathode of the picture tube 32. Resistor 94 serves to isolate the video signal applied to the cathode through the coupling capacitor 27. A fixed resistor 96 is connected in shunt with the fixed portion of resistor 92 in order to carry the necessary current to the energizing circuit of the sound system.

Switch 90 is connected to the terminal 100 of the sound system so that the switch 90 is in series between terminal 100 and the network comprising resistor 96 and brightness control 92. Terminal 100 is depicted in the diagram as a convenient point to which various current drawing electrodes of the vacuum tubes 38, 44 and 54 are connected in order to be energized.

In the audio frequency power amplifier stage 56, the screen grid of pentode tube 54 is connected to terminal 100 and this screen grid is bypassed to ground through a relatively large capacitor 102. A screen grid of the pentode tube 44 in the quadrature grid detector stage 42 is connected through an isolating resistor 106 to the terminal 100. The screen grid of tube 44 is also bypassed to ground through a capacitor 107.

In the limiter driver stage 37, the anode of tube 38 is conductive through the primary winding of the coupling transformer 40 and the decoupling resistor 108 to the terminal 100. The interconnection of transformer 40 and resistor 108 is bypassed to the screen grid of tube 38 by means of the capacitor 110. The screen grid is also connected to the terminal 100 through the resistor 112. Bypass for the screen grid of tube 38 is afforded by the capacitor 114 which is connected between the screen grid and ground. A resistor 116 is also connected between screen grid of tube 38 and ground. It will therefore be seen that there is a complete direct current path to ground from terminal 100 through the resistors 112 and 116.

During normal operation of the receiver, switch 90 is closed and a conductive path is completed from the B+ terminal (which is energized from the receiver power supply 10) through the parallel connection resistors 92, 96 through switch 90 and by way of terminal 100 to the screen grids of tubes 38, 44 and 54 as well as the anode of tube 38. These tubes are referenced to ground through the previously described cathode circuits for each of them. In this way a potential of the order of 135 volts may be provided at terminal 100 for the proper energization of stages 37, 42 and 56. The full B+ potential, which may be of the order of 265 volts, is applied through the primary winding of transformer 59 to the anode of tube 54 so that high level amplification may take place in this tube. Furthermore, a high positive potential is applied to the anode of tube 44 through the resistor 120 for proper operation of the quadrature grid sound detector. Such a high voltage is available, for example, as the bootstrap potential from the horizontal deflection circuit in the sweep and high voltage system 28. However, the remainder of the direct current for energization of the sound system 35 is derived through the current carried from the receiver power supply 10 through the parallel combination of elements 92 and 96 to the terminal 100.

The control grid of picture tube 32 is connected through a resistor 120 to the terminal 100. A vertical blanking pulse is also applied to this control grid through the blocking capacitor 122 and the resistor 123. Due to the voltage divider action from the B+ terminal through elements 92, 96 and the current path from terminal 100 to ground, the terminal 100 may be established at approximately 135 volts with respect to ground which is the potential applied to the control grid of picture tube 32. A proper direct current bias is applied to the cathode of tube 32 by adjustment of the brightness control 92. Since the B+ potential would be of the order of 265 volts, proper adjustment of control 92 will establish the cathode of tube 32 at a suitable potential positive with respect to the potential of its control grid.

During adjustment of the tuner 16 muting of the sound and blanking of the picture takes place as follows. When the motor 72 is energized, as previously described, the declutching rotor 72*a* moves to the right to open contacts of switch 90. This will interrupt the current path through the resistors 92 and 96 in the described voltage divider circuit. With the corresponding reduction in current flow through brightness control resistor 92, the potential at the variable arm thereof will rise to the B+ potential causing a rise in the cathode potential of the picture tube 32 and cutoff of current flow in that tube to darken the screen.

With switch 90 open, the B+ connection to terminal 100 is also broken. This will mean that the screen and anode potentials for the tube 38, the screen potential for tube 44, and a screen potential for tube 54 will be reduced toward zero or ground to cause cutoff of these tubes and thus no translation of the sound signal through the system 35 to the loudspeaker 60. Since capacitors 102, 107, 110 and 114 will be charged to a positive potential when the system is operating normally, there will be some fraction of a second required for these capacitors to discharge to permit the potential at terminal 100 to fall to a value for complete sound muting. Capacitor 102 being the largest in the network will be the determining factor in the time for sound muting. However, in any practical situation the discharge path through resistors 112 and 116 which are connected in parallel with capacitor 102 can be made short enough that sound muting occurs immediately after opening switch 90.

Since the control grid of the cathode ray picture tube is also connected to terminal 100, a decrease in the potential at terminal 100 when switch 90 is broken will also tend to lower the potential of this control grid toward ground. Lowering of the grid bias in this way further tends to cut off the cathode ray picture tube and blank its screen. However, the primary and immediate blanking of this tube takes place when its cathode rises due to reduction in current flow through the brightness control 92.

From the foregoing it may be seen that the described system offers a simple and effective circuit for accomplishing both picture blanking and sound muting. The system requires but a single set of switch contacts in the form of a normally closed switch which is responsive to operation of the tuner or channel selector to move to an open position. In this form the system can be constructed in a television receiver with but small additional cost in order to provide the desirable advantages of preventing the reproduction of audible background noise during channel switching and the avoidance of a flashing raster or noise pattern on the screen of the picture tube.

I claim:

1. In a television receiver, a sound muting and picture blanking system operable during channel switching, including in combination, an adjustable channel selector, a cathode ray picture tube having a cathode, a normally closed switch responsive to operation of said selector to be moved to an open position, a source of B+ energizing potential, a voltage divider connected between said switch and said source of B+ energizing potential and including an intermediate terminal connected to said cathode, and a receiver sound system including a plurality of electron control devices with an energizing circuit therefor connected to said switch for supply of operating current from said source of B+ energizing potential through said voltage divider and said switch to said sound system so that opening of said switch open circuits said energizing circuit to disable said source system and permits said cathode to rise to a cut off potential for said picture tube with recreased current through said voltage divider.

2. In a television receiver, a sound muting and picture blanking system operable during channel switching, including in combination, an adjustable channel selector having a remotely operable motor for driving the same and a normally closed switch responsive to operation of said motor to be moved to an open position, a cathode ray picture tube having a cathode, a source of B+ energizing potential, a voltage divider connected between said switch and said source of B+ energizing potential and including an intermediate terminal connected to said cathode, and a receiver sound system having a limiter circuit with a first pentode electron valve and an audio amplifier with a second pentode electron valve and an energizing circuit for said first and second valves connected to said switch for supply of operating current from said source of B+ energizing potential through said voltage divider and said switch to said first and second valves.

3. In a television receiver, a sound muting and picture blanking system operable during channel switching, including in combination, an adjustable channel selector, a cathode ray picture tube having a cathode and a control grid, a normally closed switch responsive to operation of said selector to be moved to an open position, a source of B+ energizing potential, a voltage divider connected between said switch and said source of B+ energizing potential and including an intermediate terminal connected to said cathode, a receiver sound system including a plurality of electron control devices with an energizing circuit therefor, and means connecting said switch to said control grid and to said energizing circuit for said electron control devices to supply energizing potential from said source through said voltage divider and said switch to said sound system and said control grid, whereby when said switch opens said cathode is raised to the potential of said source of B+ energizing potential coincident with removal of energizing potential from said sound system and said control grid.

References Cited in the file of this patent

UNITED STATES PATENTS

| | | |
|---|---|---|
| 3,011,017 | Oeler et al. | Nov. 28, 1961 |
| 3,096,397 | Stachowiak | July 2, 1963 |